US008836767B2

(12) United States Patent
    Endo

(10) Patent No.: US 8,836,767 B2
(45) Date of Patent: Sep. 16, 2014

(54) IMAGING APPARATUS AND IMAGING METHOD

(75) Inventor: Yuki Endo, Yokohama (JP)

(73) Assignee: Samsung Electronics Co., Ltd (KR)

(*) Notice: Subject to any disclaimer, the term of this patent is extended or adjusted under 35 U.S.C. 154(b) by 338 days.

(21) Appl. No.: 13/325,776

(22) Filed: Dec. 14, 2011

(65) Prior Publication Data

US 2012/0154647 A1    Jun. 21, 2012

(30) Foreign Application Priority Data

Dec. 17, 2010  (JP) ................................ 2010-281153
Nov. 18, 2011  (KR) ........................ 10-2011-0120698

(51) Int. Cl.
  *H04N 13/02*    (2006.01)
  *H04N 5/235*    (2006.01)
  *G03B 13/00*    (2006.01)
  *H04N 5/232*    (2006.01)

(52) U.S. Cl.
  CPC ....... *H04N 5/23212* (2013.01); *H04N 13/0239* (2013.01)
  USPC ............................................ 348/47; 348/353

(58) Field of Classification Search
  None
  See application file for complete search history.

(56) References Cited

U.S. PATENT DOCUMENTS

| 2007/0064141 | A1* | 3/2007 | Misawa et al. | 348/333.01 |
| 2008/0218613 | A1* | 9/2008 | Janson et al. | 348/262 |
| 2011/0012997 | A1* | 1/2011 | Koguchi | 348/47 |
| 2011/0018972 | A1* | 1/2011 | Pan | 348/47 |
| 2011/0090313 | A1* | 4/2011 | Tsuchita | 348/46 |
| 2011/0109727 | A1* | 5/2011 | Matsuura | 348/47 |
| 2011/0234768 | A1* | 9/2011 | Pan | 348/47 |

FOREIGN PATENT DOCUMENTS

JP    2006162990    6/2006

* cited by examiner

*Primary Examiner* — Albert Cutler
(74) *Attorney, Agent, or Firm* — The Farrell Law Firm, P.C.

(57) ABSTRACT

An imaging apparatus and an imaging method, wherein a focus location direction discriminator estimates a direction toward a focus location based on two contrast evaluation values corresponding to two imaging optical systems having different image focusing locations. Therefore, the imaging apparatus and the imaging method can directly start an AF operation at current image focusing locations of two imaging optical systems, without setting the image focusing locations to fixed initial locations in a focusing operation of the imaging optical systems. As a result, AF operation time and power consumption are reduced without failing to find a direction of image focusing location.

12 Claims, 11 Drawing Sheets

IMAGING APPARATUS AND IMAGING METHOD

PRIORITY

This application claims priority under 35 U.S.C. §119(a) to Japanese Patent Application Serial No. JP 281153/2010, which was filed in the Japan Patent Office on Dec. 17, 2010, and to Korean Patent Application Serial No. 10-2011-0120698, which was filed in the Korean Intellectual Property Office on Nov. 18, 2011, the entire disclosure of each of which is hereby incorporated by reference.

BACKGROUND OF THE INVENTION

1. Field of the Invention

The present invention relates generally to an imaging apparatus that includes two imaging optical systems that change image focusing locations, respectively, and two imagers that convert subject images formed by the two imaging optical systems into image signals, respectively.

2. Description of the Related Art

Methods of Automatic Focusing (AF) in a digital camera including imagers, such as a Charge Coupled Device (CCD) and a Complementary metal-oxide-semiconductor (CMOS), include a method called contrast AF, which scans and moves an image focusing location of an imaging optical system, acquires a contrast evaluation value in each image focusing location, detects an image focusing location having a contrast evaluation value, which is an extremum, and determines the detected image focusing location as a focus location.

FIGS. 12A to 12E illustrate an operation of a conventional imaging optical system for detecting a focus location by contrast AF.

Figure 12A:
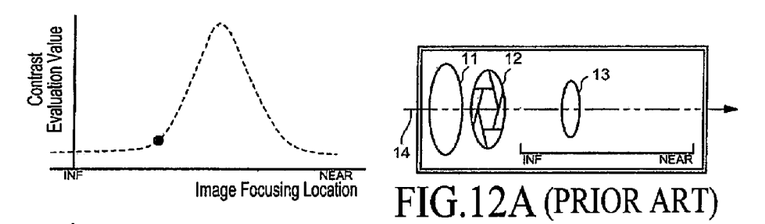
FIGS. 12A to 12E illustrate an operation of a conventional imaging optical system during a contrast AF.

Referring to FIGS. 12A to 12E, in the graphs, the dotted curve corresponds to a contrast evaluation value that is not yet determined yet, and the solid line corresponds to a part having already acquired a determined contrast evaluation value. When the image focusing location stays at an initial focus location, as illustrated in FIG. 12A, it is not clear which side, between the infinity (INF) side and the NEAR side, the renewed focus location is nearer to from the current image focusing location. Accordingly, the image focusing location is first scanned and moved in some degree in toward the INF or NEAR side to determine whether the contrast evaluation value increases or decreases. Thereafter, it is estimated that the focus location is nearer to the side corresponding to the increasing direction, before starting the operation.

Figure 12B:
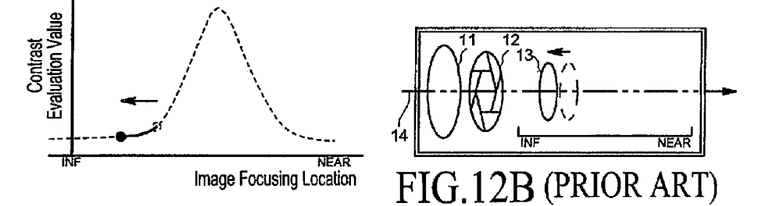

In this operation, because it is initially unclear which side the renewed focus location is nearer to from the current image focusing location, i.e., either the INF side or the NEAR side, the current image focusing location may be moved toward a side opposite to the extremum as illustrated in FIG. 12B.

Figure 12C:
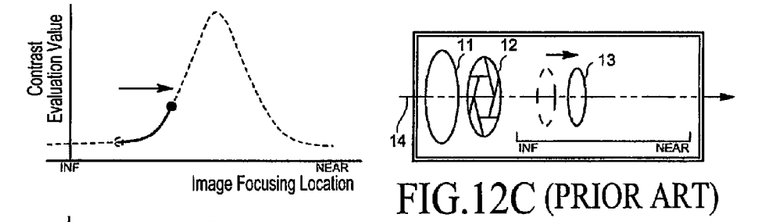

Then, as illustrated in FIG. 12C, it is required to unnecessarily perform an extra movement of the image focusing location by the distance required in order to return the image focusing location to the original position.

Figure 12D:
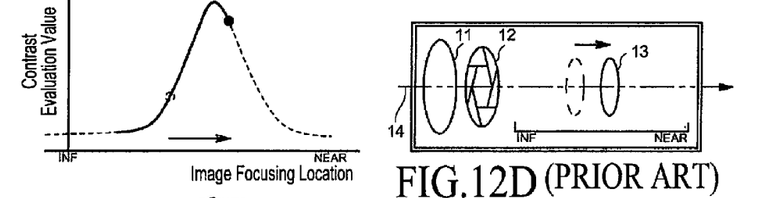
Figure 12E:
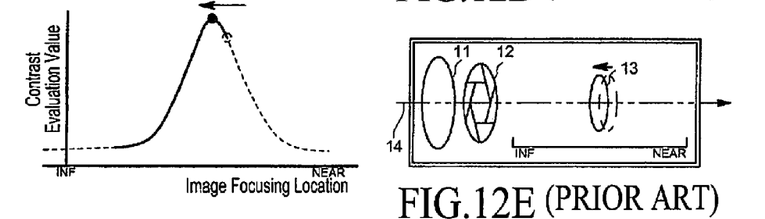

Thereafter, the image focusing location is continuously changed until the contrast evaluation value changes from the increasing trend to the decreasing trend as illustrated in FIG. 12D, and the renewed focus location is then determined by returning an over-moved image focusing location to the renewed focus location as illustrated in FIG. 12E, thereby completing the contrast AF.

In the contrast AF as described above, in an initial stage, a user cannot know which side the renewed focus location is nearer to from the current image focusing location. Therefore, especially as illustrated in FIG. 12B, the image focusing location may be moved away from the renewed focus location. In this case, the time necessary for the automatic focusing may be prolonged or it may be difficult to perform a smooth operation.

Figure 13:
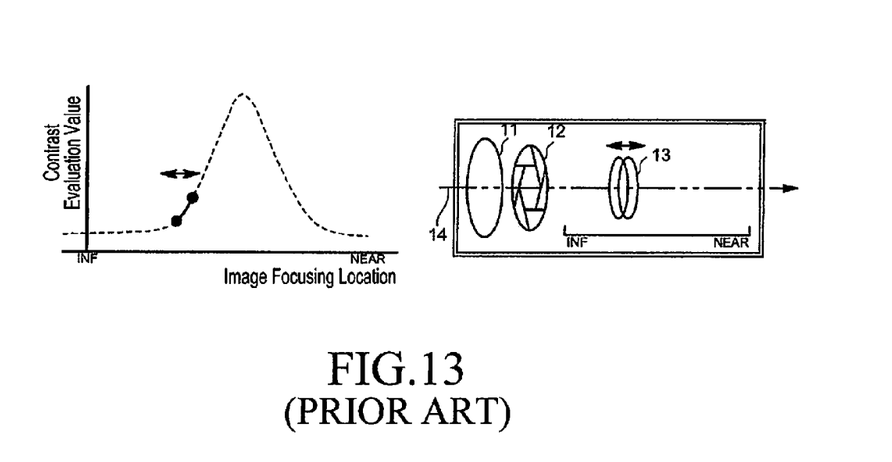
FIG. 13 illustrates an operation of a conventional imaging optical system during a contrast AF.

One method for solving the above-described problems is a called "wobbling". In wobbling, a direction toward the focus location is detected based on the trend of increasing or decreasing a contrast evaluation value acquired by minutely moving the focus lens back and forth, as illustrated in FIG. 13.

In wobbling, there is no possibility to fail in detecting the operation direction when the image focusing location is changed toward a renewed focus location. However, because the focus lens is always driven, this method requires high power consumption, which reduces battery duration.

In a stereoscopic camera having two imaging optical systems for imaging a stereoscopic image, estimation for a direction of a focus location is not especially performed. Instead, the scanning range for contrast AF is distributed to the two focus lenses of the two imaging optical systems, in order to reduce the time for the AF to a shortest time, e.g., up to nearly one-half of the original time.

Figure 14:
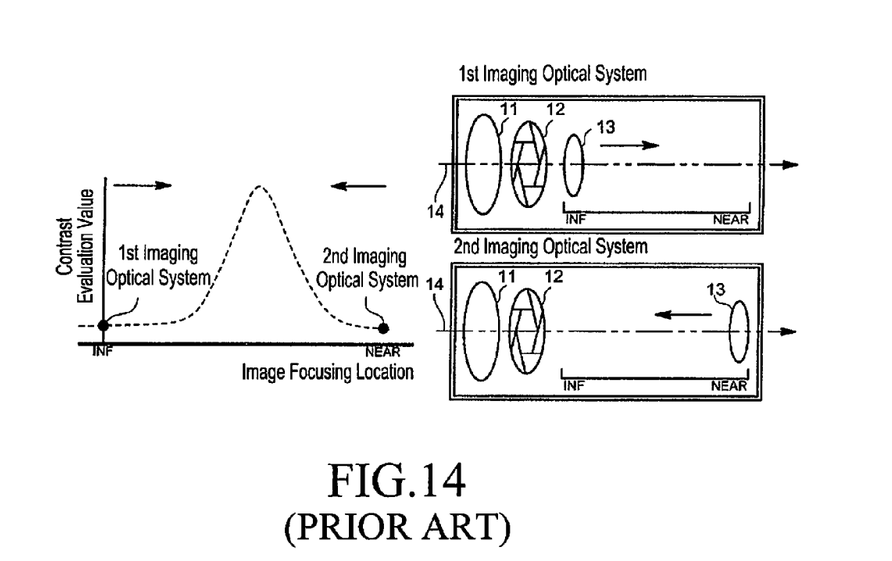
FIG. 14 illustrates a conventional method for increasing the speed of a contrast AF in a double lens camera.

For example, a double lens camera as described in Japanese Patent Unexamined Publication No. 2006-162990 includes a first imaging optical system and a second imaging optical system, and may separately control locations of respective lenses 13. Further, if the user partially pushes a shutter button, e.g., to a degree of one-half, to start an AF operation, a focus lens 13 of the first imaging optical system is moved toward the INF end, a focus lens 13 of the second imaging optical system is moved toward the NEAR end, and respective focus lenses 13 are scan-moved to a center side as illustrated in FIG. 14, in order to find an image focusing location having a peak contrast evaluation value.

Figure 15:
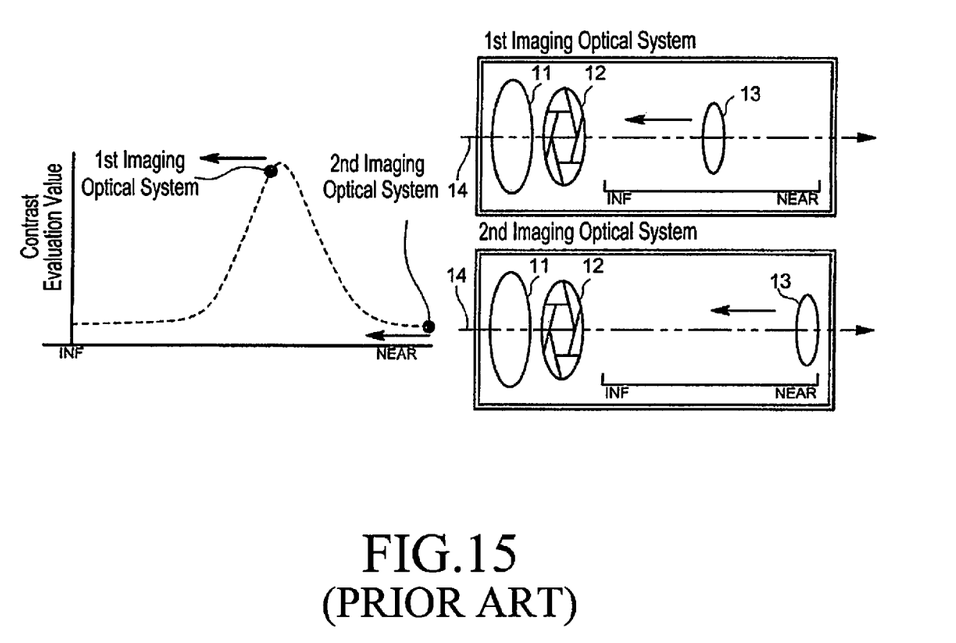
FIG. 15 illustrates another conventional method for increasing the speed of another contrast AF in a double lens camera.

Further, in another example described in Japanese Patent Unexamined Publication No. 2006-162990, as illustrated in FIG. 15, if the user partially pushes a shutter button, e.g., to a degree of one-half, to start an AF operation, the focus lens 13 of the first imaging optical system is substantially arranged at a center of a drivable range, a focus lens 13 of the second imaging optical system is arranged at the NEAR end, and respective focus lenses 13 are then scan-moved to the INF end while maintaining a spacing distance between them, in order to detect a focus location in an imaging optical system.

As noted from the foregoing examples, in a double lens camera, the distribution of the scan-movement range to the two lenses helps reduce the time for the AF, up to nearly one-half of the original time.

However, in the contrast AF method described in Japanese Patent Unexamined Publication No. 2006-162990, in order to distribute the scanning range and to eliminate the necessity for consideration of the driving direction, the focus lens still needs to be moved first to predetermined positions, including the INF side, the NEAR side, and the center, such that a driving time is still incurred for this portion of the operation. That is, because to the conventional methods cannot start the focusing operation at the current image focusing location, the time or power consumption required for an initial arrangement increases.

Further, according to the renewed focus location or the image focusing location before the focusing operation, the initial arrangement operation may require an operation of returning the image focusing location having passed a renewed focus location to the renewed focus location, which may also cause an unnecessary movement, e.g., as illustrated in FIG. 12B.

SUMMARY OF THE INVENTION

The present invention has been made to solve at least the above-described problems occurring in the prior art, and to provide at leas the advantages described below.

Accordingly, an aspect of the present invention is to provide an imaging apparatus and an imaging method that directly start an AF operation at current image focusing locations of two imaging optical systems, without setting the image focusing locations to fixed initial locations, in a focusing operation of the imaging optical systems, reducing the time for the AF operation, and power consumption.

In accordance with an aspect of the present invention, an imaging apparatus is provided. The image apparatus includes two imaging optical systems that change image focusing locations; two imagers that convert images of a subject formed by the imaging optical systems into two image signals, respectively; a contrast evaluation value output unit that outputs contrast evaluation values of the subject in the two images of the subject, respectively; a focus location detector that detects a focus location corresponding to a conclusive focus location for focusing the subject, wherein the focus location is determined based on contrast evaluation values at a plurality of image focusing locations; a focus location controller that controls image focusing locations and deviates an image focusing location of an imaging optical system of one side and an image focusing location of an imaging optical system of another side from the focus location, before the focus location detector detects the focus location; and a focus location direction discriminator that determines a direction toward the focus location for focusing the subject from a current image focusing location of each of the two imaging optical systems, based on two contrast evaluation values output in accordance with the two imaging optical systems, wherein the image focusing locations of the two imaging optical systems are deviated from the focus location.

In accordance with another aspect of the present invention, an imaging method is provided for an imaging apparatus, which includes two imaging optical systems that change image focusing locations, two imagers that convert images of a subject formed by the two imaging optical systems into image signals, respectively, a contrast evaluation value output unit that outputs contrast evaluation values of the subject in the images, respectively, and a focus location detector that detects a focus location corresponding to a conclusive focus location for focusing the subject, is the focus location being determined based on contrast evaluation values at a plurality of image focusing locations. The imaging method includes controlling image focusing locations and controlling the image focusing locations of the two imaging optical systems to be deviated from the focus location, before the focus location detector detects the focus location; and determining a direction toward the focus location for focusing the subject from a current image focusing location of each of the two imaging optical systems, based on two contrast evaluation values output in accordance with the two imaging optical systems, wherein the image focusing locations of the two imaging optical systems are deviated from the focus location.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Figure 1:
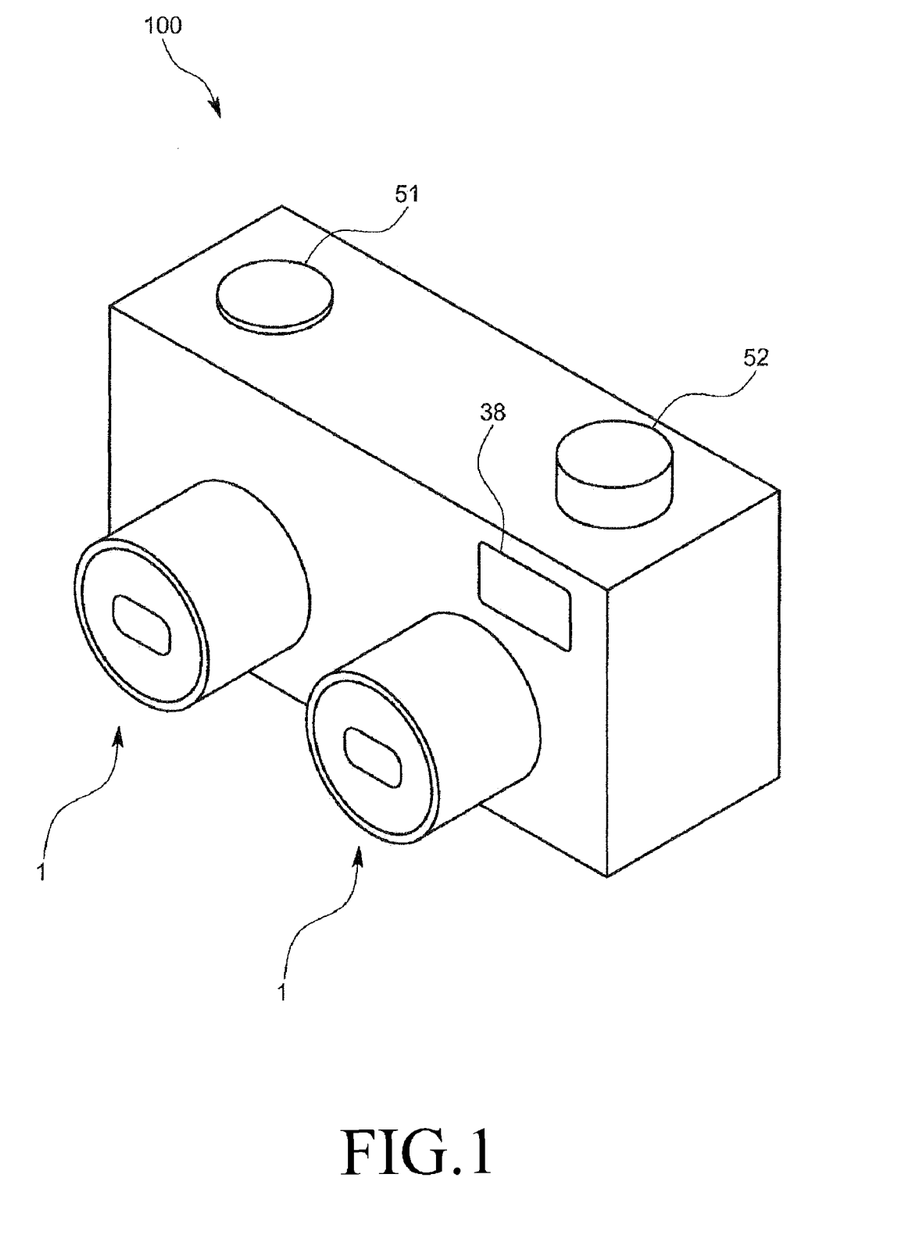
FIG. 1 is a schematic front perspective view illustrating an imaging apparatus according to an embodiment of the present invention.
Figure 2:
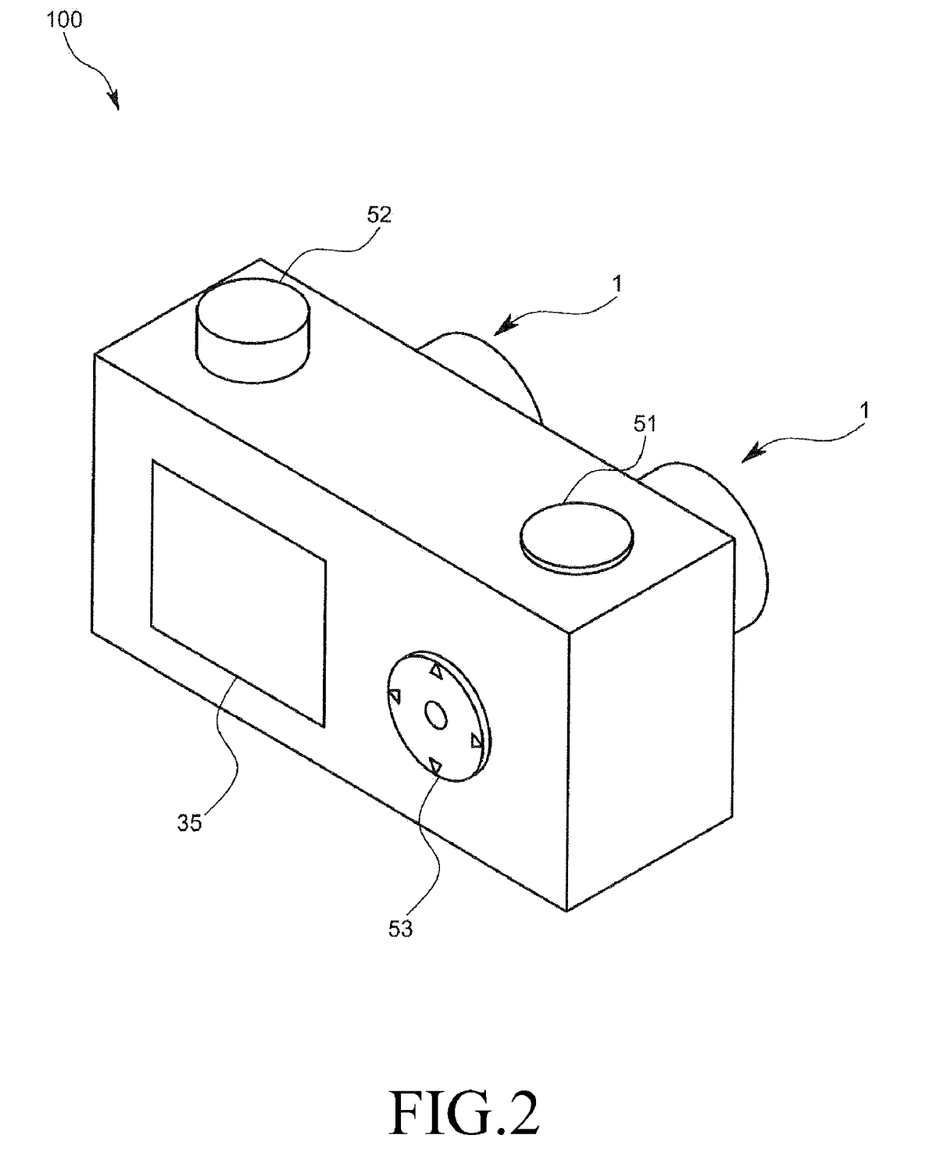
FIG. 2 is a schematic rear perspective view illustrating an imaging apparatus according to an embodiment of the present invention.

FIG. 1 is a schematic front perspective view illustrating an imaging apparatus according to an embodiment of the present invention, and FIG. 2 is a schematic rear perspective view illustrating an imaging apparatus according to an embodiment of the present invention.

Referring to FIG. 1, the imaging apparatus 100 corresponds to an apparatus for imaging a stereoscopic image. As noted from the front perspective view in FIG. 1, two tubes protrude in parallel to each other from a front surface of the imaging apparatus 100, and a strobe device 38 is provided at the front surface thereof. When power is turned on, the two tubes of the imaging apparatus 100 maintain imaging optical systems 1. When the power is turned-off, the tubes are received within the imaging apparatus 100.

Additionally, as illustrated in FIG. 2, a monitor 35 in which a user can view a stereoscopic image and operating keys 53 that are used for various operations are provided at a rear surface of the imaging apparatus 100. For example, the monitor 35 may be a 3D monitor using a lenticular lens. Further, a shutter button 51 used for a shutter release operation and a mode dial 52 used for changing a photographing mode are provided at an upper surface of the imaging apparatus 100.

In the imaging apparatus 100, a subject is simultaneously imaged by the two imaging optical systems 1, creating two images having a parallax. Based on the two images having a parallax, a stereoscopic image is created on the monitor 35.

Figure 3:
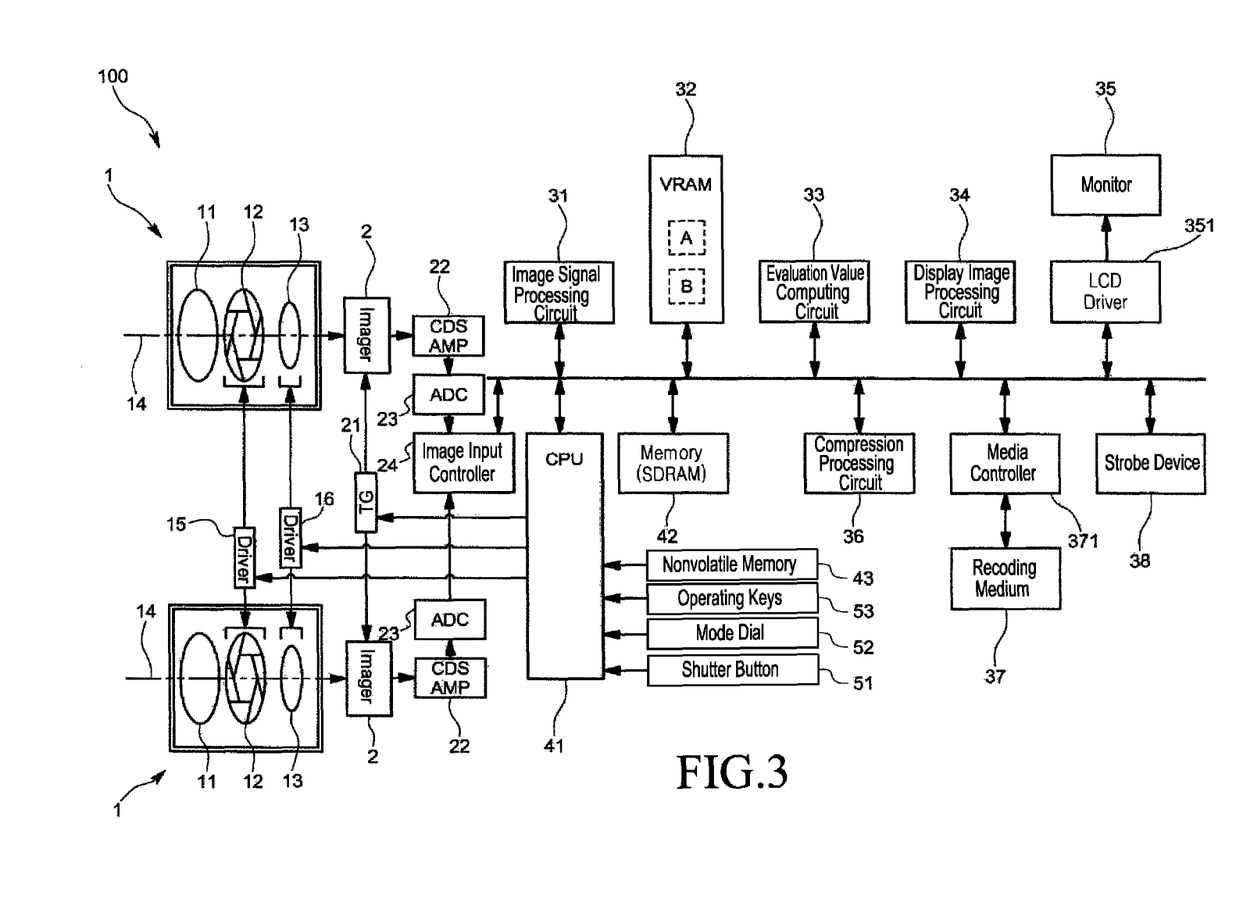
FIG. 3 is a block diagram illustrating an imaging apparatus according to an embodiment of the present invention.

FIG. 3 is a block diagram illustrating an imaging apparatus according to an embodiment of the present embodiment.

Referring to FIG. 3, the imaging apparatus, e.g., a digital camera, includes two imaging optical systems 1, two imagers 2, an image signal processing circuit 31, a Video Random Access Memory (VRAM) 32, an evaluation value computing circuit 33, a display image processing circuit 34, a monitor 35, a compression processing circuit 36, a recoding medium 37, a Central Processing Unit (CPU) 41, and memories 42 and 43.

In the following description, to discriminate between the two imaging optical systems 1 and between the two imagers 2, the prefix "first" is used for the imaging optical system 1 for generating a left image of the stereoscopic image and the prefix of "second" is used for the imaging optical system 1 for generating the right image of the stereoscopic image.

The imaging optical systems 1 are situated in parallel to each other and are spaced apart from each other by a distance nearly the same as the parallax of two eyes of a human so that the imaging optical systems 1 are in parallel to the optical axes 14. Further, in each of the imaging optical systems 1, a zoom lens 11, an iris 12, and a focus lens 13 are sequentially disposed from an outside along the optical axis 14 and the imager 2 is disposed at a rear side of the focus lens 13. For example, a CCD type image sensor or a CMOS type image sensor may be used as the imager 2.

An iris motor is connected to the iris 12 and is used to control an amount of exposure by limiting optical flux by changing a value of the iris 12 during an Auto Exposure (AE) operation. Further, a lens motor is connected to the focus lens 13 and moves the focus lens 13 along the optical axis 14 of the imaging optical system 1 during an AF operation, in order to control the image focusing location of the imaging optical system 1 for focus adjustment.

The imager 2 converts an image of a subject taken by the imaging optical system 1 into an image signal. The imager 2 is connected to a Timing Generator (TG) 21, which controls the storage and transmission of optical charges by the imager 2. Further, the iris 12 and the focus lens 13 are controlled by the CPU 41 through drivers 15 and 16, and the imager 2 is controlled by the CPU 41 through the TG 21.

An image signal output from the imager 2 is input to a Correlated Double Sampling circuit/Amplifier (CDS AMP) 22 and then to an Analog to Digital Converter (ADC) 23, which converts the image signal from analog data to digital data. The input/output of the image signal having been converted into the digital data is controlled by an image input controller 24. The image signal is input to the image signal processing circuit 31, which performs white balance compensation and γ compensation processing for the input image signal. The compensation processed image signal includes a first image taken by the first imaging optical system 1 and a second image taken by the second imaging optical system 1, which are first separately stored in predetermined areas A and B of the VRAM 32. The individual images stored in the VRAM 32 are updated at each predetermined time period. Specifically, the images are updated in accordance with the exposure and the output of an image signal, e.g., at each 1/30 seconds (1 frame), by the imager 2.

The evaluation value computing circuit 33 computes an AF evaluation value and an AE evaluation value from first and second images stored in the VRAM 32. The AF evaluation value corresponds to a deviation evaluation value, which refers to an evaluation value of a deviation of an image of a subject formed by each imager 2 from an optical axis of the image 2, a subject distance evaluation value including an evaluation value of a phase difference between two images, or a contrast evaluation value. The subject distance evaluation value is used to compute a distance of a subject as will be described below.

Further, the contrast evaluation value is computed by adding a high frequency component of a luminance value with respect to a predetermined region of each image. That is, a contrast (luminance difference) between adjacent pixels is added within a predetermined region.

Additionally, the AE evaluation value is computed by adding a luminance value with respect to each image data and indicates the brightness of an image.

The contrast evaluation value and the AE evaluation value are used for an AF operation and an AE operation, as will be described below.

The display image processing circuit 34 generates and displays a stereoscopic image for stereoscopic expression on a Liquid Crystal Display (LCD) monitor 35 by combining the first image and the second image stored in the VRAM 32. When a photographing mode has been selected by the mode dial 52 and the LCD monitor 35 is used as a view finder, the stereoscopic image combined by the display image processing circuit 34 is displayed as a through image on the LCD monitor 35 through an LCD driver 351.

On the other hand, according to another embodiment of the present invention, it may be possible that the first image or second image stored in the VRAM 32 is displayed on the LCD monitor 35 without use of the combined stereoscopic image.

The compression processing circuit 36 compresses the first and second images stored in the VRAM 32 in a compressing format such as a Joint Photographic Experts Group (JPEG) format. The media controller 371 stores the images compressed by the compression processing circuit 36 in a recording medium 37, such as a memory card.

Further, when a view mode is selected by the mode dial 52, the stereoscopic image created from the first and second images stored in the recording medium 37 is displayed on the monitor 35.

Although a detailed construction of the monitor 35 is not illustrated in FIG. 3, the monitor 35 includes a filter formed on a surface of the monitor, which is formed by a lenticular lens including a plurality of small lenses, each having a convex center, extending in parallel.

Further, different images are transferred to the left and right eyes from the image displayed on the monitor 35, enabling naked eyes (i.e., without glasses) to achieve a stereoscopic vision.

For example, the monitor 35 may be a parallax barrier type monitor having a parallax barrier display layer on a surface thereof. More specifically, the monitor 35 may be configured to display a stereoscopic image by generating a parallax barrier from optical transmission parts and optical shield parts alternately arranged with a predetermined pitch on a parallax barrier display layer and simultaneously displaying stripshaped image fragments indicating left and right images alternately arranged on the virtual image display surface.

The CPU 41 generally controls an overall operation of the imaging apparatus 100, and is connected to a nonvolatile memory 43, as well as to the shutter button 51, the mode dial 52, and the various operation keys 53.

The shutter button 51 has a two-stage push switch configuration. Accordingly, if the shutter button 51 is partially pushed by the user (e.g., half pushed), a photographing preparation operation starts. If the shutter button 51 is completely pushed, a photographing processing is performed and first and second images for one screen are transmitted from the VRAM 32 to the recoding medium 37 and stored in the recoding medium 37.

Further, when a playback mode is selected using the mode dial 52, the photographed image stored in the recording medium 37 is synthesized into a stereoscopic image by the display image processing circuit 34, and the stereoscopic image is then displayed on the monitor 35.

The nonvolatile memory 43 stores various control programs or setting information.

Figure 4:
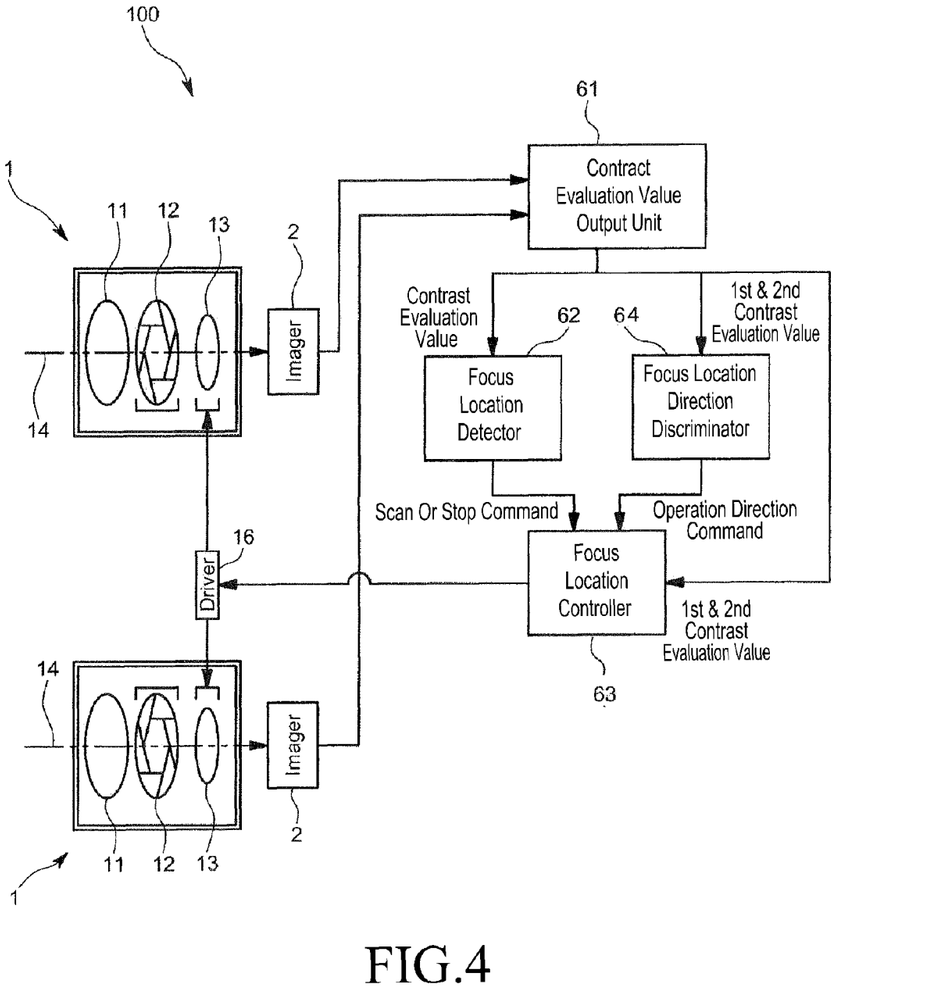
FIG. 4 is a block diagram illustrating an imaging apparatus associated with a focusing operation according to an embodiment of the present invention.

The CPU 41, the Synchronous Dynamic Random Access Memory (SDRAM) 42, the nonvolatile memory 43, various circuits, and the recording medium 37 are operatively associated with each other, and perform functions of at least a contrast evaluation value output unit 61, a focus location detector 62, a focus location controller 63, a focus location direction discriminator 64, as illustrated in FIG. 4.

FIG. 4 is a block diagram illustrating an imaging apparatus associated with a focusing operation according to an embodiment of the present invention.

Referring to FIG. 4, the contrast evaluation value output unit 61 outputs separate contrast evaluation values corresponding to respective imaging optical systems 1 using the evaluation value computing circuit 33. That is, the contrast evaluation value output unit 61 calculates a contrast evaluation value for a subject, e.g., within a predetermined region of each image, and inputs the calculated contrast evaluation value to the focus location detector 62 and the focus location direction discriminator 64.

The focus location detector 62 detects a focus location, which corresponds to a conclusive focus location for focusing of a subject, which is determined based on contrast evaluation values at a plurality of image focusing locations.

More specifically, the focus location detector 62 scan-moves the image focusing location to search for a point at which the contrast evaluation value becomes a peak (an extremum) and outputs that image focusing location as a focus location. For example, when the focus lens 13 is continuously moved toward the INF side or the NEAR side, the contrast evaluation value output from the contrast evaluation value output unit 61 may change from an increasing trend to a decreasing trend. Here, the focus location is detected using such a change.

The focus location controller 63 controls scan movement of the focus lens 13 when a focus location is detected by the focus location detector 62 or controls the location of the focus lens 13 in other operations.

Figure 5:
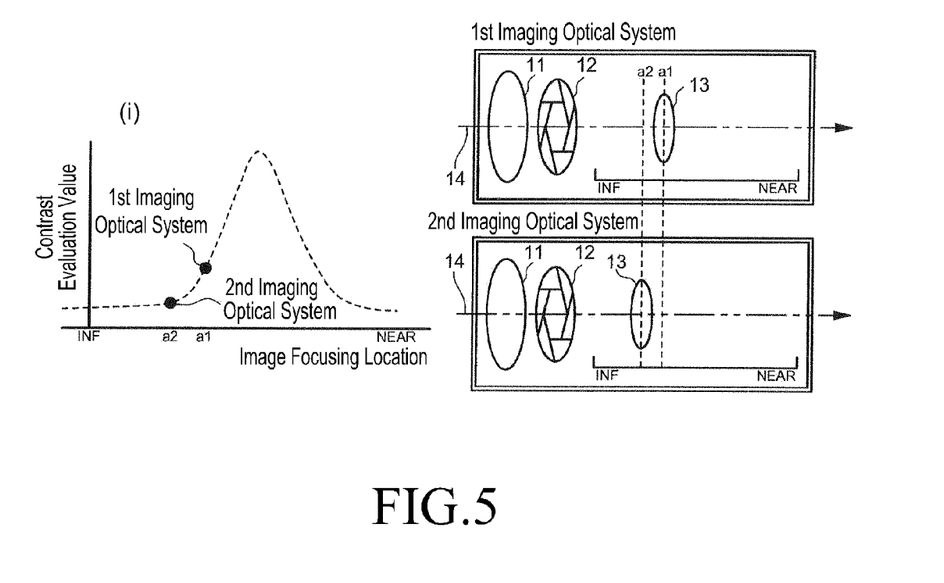
FIG. 5 illustrates locations of respective focus lenses in a focusing operation standby state according to an embodiment of the present invention.

In accordance with an embodiment of the present embodiment, when waiting for the start of the AF operation, without a half-push of the shutter button 51 by the user, the focus lenses 13 of the first and the second imaging optical systems 1 are deviated along the optical axis as illustrated in FIG. 5. Here, the quantity of deviation in the AF operation standby state corresponds to a very small spacing distance capable of displaying a through image, which has been formed by each imaging optical system 1, on the monitor 35 without a disharmony.

Figure 6:
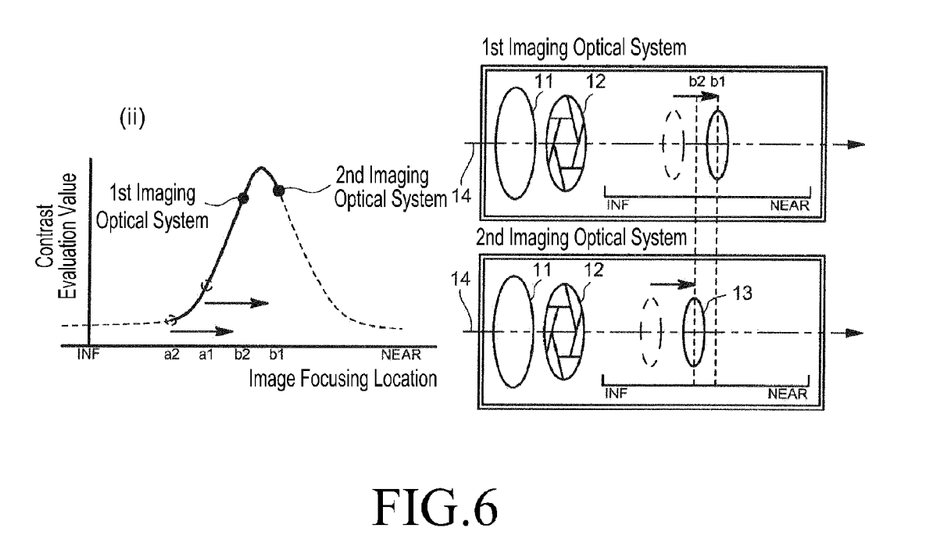
FIG. 6 illustrates operations of respective focus lenses and an acquisition situation of a contrast evaluation value, after acquisition of a focus location direction according to an embodiment of the present invention.
Figure 7:
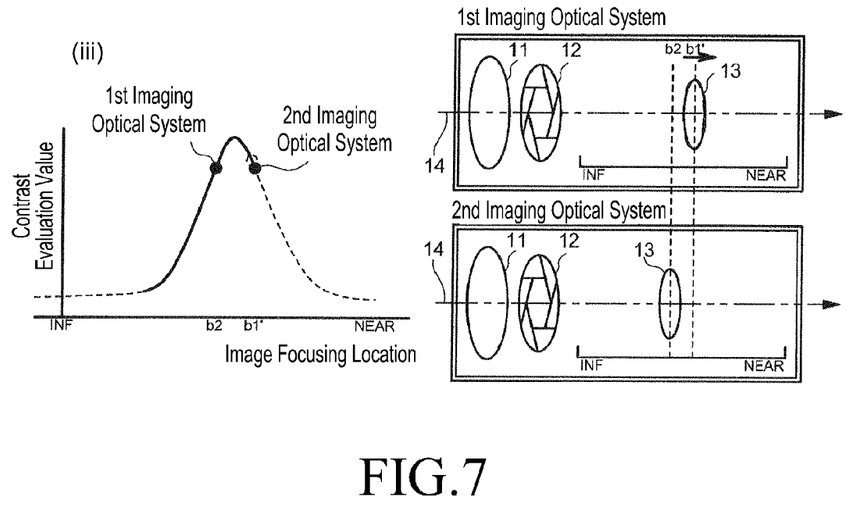
FIG. 7 illustrates operations of respective focus lenses and an acquisition situation of a contrast evaluation value after acquisition of a focus location according to an embodiment of the present invention.

Further, in the focus location control, if the direction toward the focus location has been determined by the focus location direction discriminator 64, the image focusing location is moved toward the focus location while maintaining the quantity of deviation of each focus lens 13 as illustrated in FIG. 6.

Further, when the focus location detector 62 detects the focus location based on a contrast evaluation value output in accordance with a preceding focus lens 13, the focus location controller 63 controls each focus lens 13 to wait at a position prior to or after the focus location, until the shutter button 51 is fully pushed by the user to start the main shooting. In other words, the focus location controller 63 prevents a following focus lens 13 from moving beyond the focus location and each focus lens 13 should be located near the focus location while maintaining the state in which the focus has been nearly formed, until the focus location is detected and the main shooting is started.

The focus lenses 13 are placed at locations before and after the focus location, at which two contrast evaluation values corresponding to the focus lenses 13 are the same. Therefore, the focus lenses 13 are maintained and spaced apart from each other by a predetermined distance with the focus location between them. By constructing the focus location controller 63 in this way, even when there is deviation of the focus location, e.g., due to movement of a subject, as illustrated in FIG. 8, it is possible to detect the movement of the subject according to the change of the contrast evaluation value along each image focusing location and estimate the new focus location.

Figure 8:
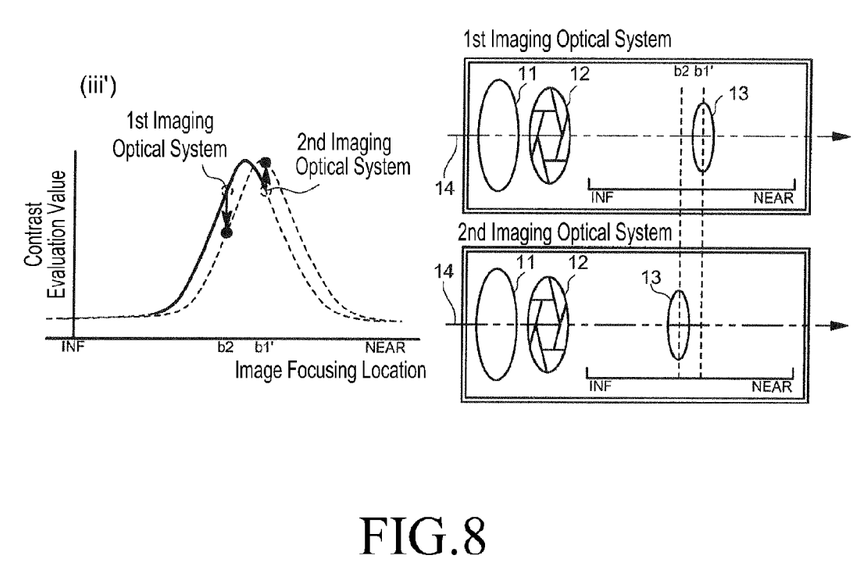
FIG. 8 illustrates a change of respective contrast evaluation values when a focusing subject moves in a state of FIG. 7.

Specifically, as illustrated in FIG. 8, when the focus location deviates toward the NEAR side, the contrast evaluation value of the imaging optical system 1 having the focus lens 13 at the NEAR side increases, while the contrast evaluation value of the imaging optical system 1 having the focus lens 13 at the INF side decreases. In contrast, when the focus location deviates toward the INF side, a result opposite to the above is yielded.

Accordingly, the focus location is estimated to be in the direction in which the contrast evaluation value increases. For example, when the current contrast evaluation value changes due to movement of the subject, the focus location controller 63 moves each focus lens 13 in a direction toward the INF side or NEAR side in which the contrast evaluation value increases, while maintaining the space between the focus lenses 13. The focus location controller 63 then stops the focus lens 13 at a point at which the contrast evaluation value becomes the same. Accordingly, even when there is a movement of a subject during the standby state for the main shooting, it is possible to maintain each focus lens 13 near the focus location in a nearly focused state.

Figure 9:
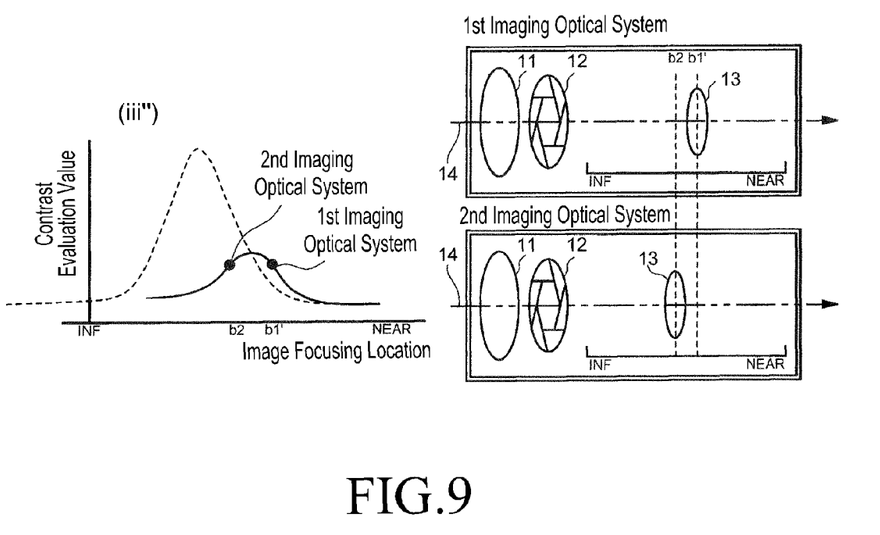
FIG. 9 illustrates when there are two subjects having different contrast evaluation values in a state of FIG. 7.

Further, as illustrated in FIG. 9, even when a high contrast evaluation value appears near a subject having a low contrast evaluation value, in spite of a deviation of two parts from the focus location, the arrangement of the focus lens 13 makes it easy to detect the change of the subject having the low contrast evaluation value.

Figure 10:
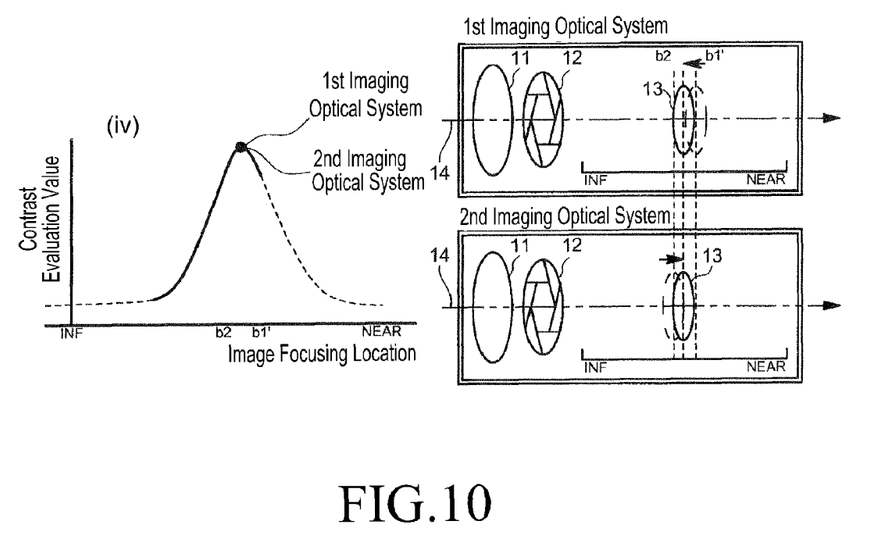
FIG. 10 illustrates operations of respective focus lenses after starting a photographing operation according to an embodiment of the present invention.

In addition, when the shutter button 51 has been fully pushed by the user, as illustrated in FIG. 10, the focus location controller 63 moves each focus lens 13 to the focus location and then allows the main shooting to be performed. Thereafter, a quantity of movement of the focus lens 13 is calculated from a difference between the detected focus location and the space between the focus lenses 13 in the shooting standby state, thereby enabling the focusing without re-execution of the contrast AF through a scan-movement, even when the subject has moved as illustrated in FIG. 8.

When each focus lens 13 of each imaging optical system 1 has deviated a predetermined distance from the focus location, as illustrated in FIG. 5, the focus location detector 62 determines the direction toward the focus location based on the contrast evaluation value output from the contrast evaluation value output unit 61 in accordance with each imaging optical system 1.

More specifically, the focus location detector 62 compares contrast evaluation values at locations of the focus lenses 13 in order to determine a larger contrast evaluation value between the contrast evaluation values of the first imaging optical system 1 and the second imaging optical system 1 and to determine the focus lens 13 to be operated between the focus lens 13 of the INF side and the focus lens 13 of the NEAR side. In other words, as illustrated in FIG. 5, the focus location direction discriminator 64 operates the focus lens 13 at the image focusing location having the larger contrast evaluation value among the two contrast evaluation values.

Figure 11:
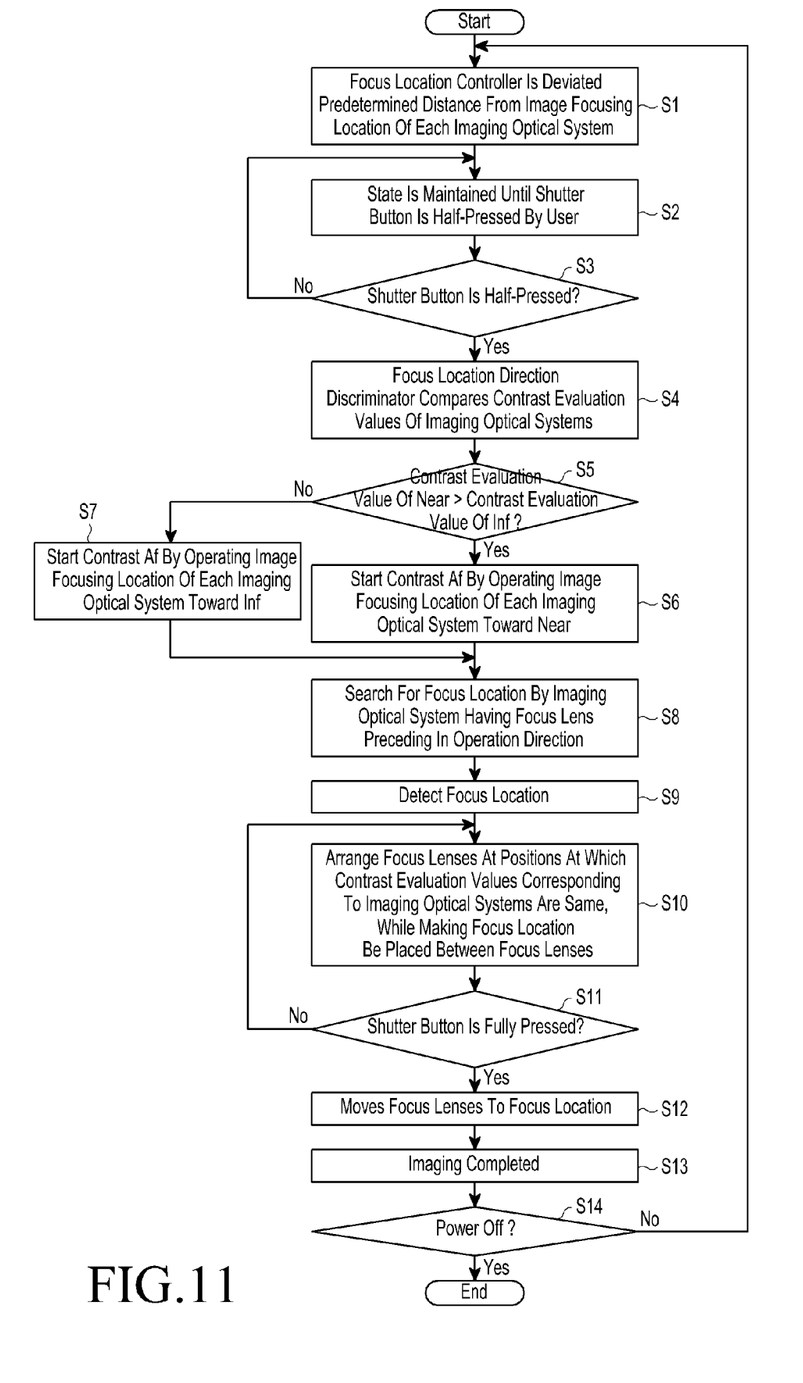
FIG. 11 is a flowchart illustrating a photographing operation according to an embodiment of the present invention.

FIG. 11 is a flowchart illustrating a photographing operation according to an embodiment of the present invention.

Referring to FIG. 11, when the imaging apparatus is powered on, in step S1, a focus location control is started, wherein a location of a focus lens 13 of each imaging optical system 1 is predetermined and is deviated a predetermined distance from the focus location, as illustrated in FIG. 5.

While maintaining each focus lens 13 in the deviated state, in step S2, a user half-pushes the shutter button 51 and waits for a starting of the focusing operation.

When the half-push of the shutter button 51 by the user is detected in step S3, the focus location direction discriminator 64 starts to compare the first and second contrast evaluation values output from the contrast evaluation value output unit 61 in accordance with the imaging optical systems 1 in step S4.

In step S5, the focus location direction discriminator 64 determines whether the contrast evaluation value corresponding to the imaging optical system 1 having a focus lens 13 located nearer to the NEAR side is larger than the contrast evaluation value corresponding to the imaging optical system 1 having a focus lens 13 located nearer to the INF side, and when the focus location direction discriminator 64 has determined that the contrast evaluation value corresponding to the imaging optical system 1 having a focus lens 13 located nearer to the NEAR side is the larger value, the focus location controller 63 operates each focus lens 13 toward the NEAR side, while maintaining the quantity of deviation of the focus lens 13 of each imaging optical system 1, and starts the contrast AF in step S6. However, when the focus location direction discriminator 64 determines that the contrast evaluation value corresponding to the imaging optical system 1 having a focus lens 13 located nearer to the NEAR side is not the larger value, the focus location controller 63 operates each focus lens 13 toward the INF side and starts the contrast AF in step S7.

In step S8, the focus location detector 62 searches for the focus location based on the contrast evaluation value corresponding to the imaging optical system 1 having the focus lens 13 preceding in the operation direction. As illustrated in FIG. 5, when the preceding focus lens 13 is moved beyond the focus location, the focus location is detected in step S9.

In step S10, the focus location controller 63 arranges the focus lenses 13 at the positions at which contrast evaluation values corresponding to the imaging optical systems 1 are the same, while placing the focus location between the focus lenses 13, as illustrated in FIG. 6.

In step S11, the focus location control waits until the main shooting is started by a full pressing of the shutter button 51 by the user, while maintaining the focus lenses 13 at a predetermined distance apart from the focus location.

When the shutter button 51 is fully pressed by the user and the main shooting is started, the focus location controller 63 moves the focus lenses 13 to the focus location in step S12, as illustrated in FIG. 10, and the shutter is released and the shooting is completed in step S13.

Thereafter, if the power is not interrupted, the operation returns to step S1 without a deviation in each focus lens 13, as illustrated in FIG. 10, and the focus location controller 63 performs a location control so that each focus lens 13 has a deviation along the optical axis.

Using an imaging apparatus as described in the embodiments of the present invention above, where the imaging apparatus remains in a standby state before the shutter button is half pressed to start a focusing operation, because the location of each focus lens is deviated by a small distance, it is possible to obtain a contrast evaluation value at each image focusing location, even without operation of each focus lens.

Further, because the focus location direction discriminator 64 can directly determine, based on a comparison between two contrast evaluation values, that the focus location is placed at the side of the focus lens corresponding to the larger contrast evaluation value, the direction of operation can be determined when starting the contrast AF. Therefore, the above-described embodiments of the present invention can reduce in large part the time for the auto focusing.

Further, the contrast AF method according to an embodiment of the present invention can be started at any position, as there is no restriction on the initial position of the focus lens at the time of starting the focusing operation in the contrast AF method. This advantage prevents additional movement of the focus lens and reduces a detection time of the focus location.

Further, until the starting of the main shooting after detection of the focus location, the focus lenses are not arranged on the focus location itself and are arranged with the focus location between them, thereby making it possible to detect any movement of the subject. Accordingly, it is also possible to continuously achieve an exact focusing without performing a new contrast AF, such as new movement of the focus lenses in accordance with the movement of the subject.

Further, in the above-described embodiments of the present invention, most of the operation of the focus lenses is achieved in a single scan movement at the time of detecting the focus location and does not require continuous movement, such as wobbling. Therefore, the above-described embodiments of the present invention reduce power consumption and increase the AF operation speed.

Alternatively, it is also possible for a quantity of deviation of each focus lens by the focus location controller in the focusing operation standby state to be smaller than or equal to, e.g., at most ¼ of, the operation range of each focus lens. In order to make a through image be more easy to be viewed and to increase the precision of the AF operation, it is also possible for the quantity of deviation of each focus lens to be set to a minimum quantity of deviation according to a detection resolution limit of the contrast evaluation value.

The contrast evaluation value at the time of determination of the direction toward the focus location by the focus location direction discriminator can be set to a value, which makes it easy to detect a difference between contrast evaluation values, e.g., the contrast evaluation value may be intentionally prevented from having an algebraic value.

In an imaging apparatus and an imaging method according to the above-described embodiments of the present invention, a focus location direction discriminator estimates a direction toward a focus location based on two contrast evaluation values corresponding to two imaging optical systems having different image focusing locations. Therefore, the imaging apparatus and the imaging method can directly start an AF operation at current image focusing locations of two imaging optical systems, without setting the image focusing locations to fixed initial locations in a focusing operation of the imaging optical systems. As a result, the imaging apparatus and the imaging method according to the above-described embodiments of the present invention reduce AF operation time, without failing to find a direction of image focusing location, and reduce power consumption.

While the present invention has been shown and described with reference to certain embodiments thereof, it will be understood by those skilled in the art that various changes in form and details may be made therein without departing from the spirit and scope of the present invention as defined by the appended claims.

What is claimed is:

1. An imaging apparatus comprising:
   two imaging optical systems that change image focusing locations;
   two imagers that convert images of a subject formed by the imaging optical systems into two image signals, respectively;
   a contrast evaluation value output unit that outputs contrast evaluation values of the subject in the two images of the subject, respectively;
   a focus location detector that detects a focus location corresponding to a conclusive focus location for focusing the subject, wherein the focus location is determined based on contrast evaluation values at a plurality of image focusing locations;
   a focus location controller that controls image focusing locations and deviates an image focusing location of an imaging optical system of one side and an image focusing location of an imaging optical system of another side from the focus location, before the focus location detector detects the focus location, wherein the focus location controller maintains the image focusing locations of the two imaging optical systems to be deviated at a fixed distance from each other as the contrast evaluation values are being determined; and
   a focus location direction discriminator that determines a direction toward the focus location for focusing the subject from a current image focusing location of each of the two imaging optical systems, based on two contrast evaluation values output in accordance with the two imaging optical systems, wherein the image focusing locations of the two imaging optical systems are deviated from the focus location.

2. The imaging apparatus of claim 1, wherein the focus location direction discriminator determines an increasing or decreasing trend of the two contrast evaluation values according changes of the image focusing locations from the image focusing locations of the two imaging optical systems and the two contrast evaluation values, which are output in accordance with locations of the imaging optical systems, and determines that the focus location is in a direction in which one of the two contrast evaluation values increase.

3. The imaging apparatus of claim 1, wherein the focus location controller maintains the image focusing locations of the two imaging optical systems to be deviated a predetermined distance from the focus location until an operation related to detection of the focus location is initiated.

4. The imaging apparatus of claim 1, wherein, when a shooting is performed by only one of the two imaging optical systems, the focus location controller scans the image focusing locations toward the focus location while causing an image focusing location of the other of the two imaging optical systems to precede an image focusing location of an imaging optical system of the one of the two imaging optical systems.

5. The imaging apparatus of claim 1, wherein, in a standby state, the focus location controller maintains the image focusing locations of the two imaging optical systems to be deviated a predetermined distance from the focus location.

6. The imaging apparatus of claim 5, wherein, in the standby state, the focus location controller controls placement of the image focusing locations of the two imaging optical systems before and after the focus location, such that the contrast evaluation values of the two images of the subject corresponding to the two image focusing locations are equal to each other.

7. An imaging method of an imaging apparatus including two imaging optical systems that change image focusing locations, two imagers that convert images of a subject formed by the two imaging optical systems into image signals, respectively, a contrast evaluation value output unit that outputs contrast evaluation values of the subject in the images, respectively, and a focus location detector that detects a focus location corresponding to a conclusive focus location for focusing the subject, the focus location being determined based on contrast evaluation values at a plurality of image focusing locations, the imaging method comprising the steps of:
   controlling image focusing locations and controlling the image focusing locations of the two imaging optical systems to be deviated from the focus location, before the focus location detector detects the focus location;
   maintaining deviations of the image focusing locations of the two imaging optical systems at a fixed distance from each other as the contrast evaluation values of the subject in the images are being determined; and
   determining a direction toward the focus location for focusing the subject from a current image focusing location of each of the two imaging optical systems, based on two contrast evaluation values output in accordance with the two imaging optical systems, wherein the image focusing locations of the two imaging optical systems are deviated from the focus location.

8. The imaging method of claim 7, wherein determining the direction toward the focus location comprises:
   identifying an increasing or decreasing trend of the two contrast evaluation values according to change of the image focusing locations determined from the image focusing locations of the two imaging optical systems and the two contrast evaluation values, which are output in accordance with the locations of the imaging optical systems; and determining that the focus location is placed in a direction in which one of the two contrast evaluation values increases.

9. The imaging method of claim 7, wherein controlling the image focusing locations comprises maintaining deviations of the image focusing locations of the two imaging optical systems at a predetermined distance from the focus location, until an operation related to detection of the focus location is initiated.

10. The imaging method of claim 7, wherein, when shooting is performed by only one of the two imaging optical systems, the image focusing locations of the two imaging optical systems are scanned toward the focus location while an image focusing location of the other of the two imaging optical systems precedes an image focusing location of the one of the two imaging optical systems.

11. The imaging method of claim 7, wherein controlling the image focusing locations comprises maintaining the image focusing locations of the two imaging optical systems to be deviated a predetermined distance from the focus location in a standby state up to a starting of a main shooting.

12. The imaging method of claim 11, wherein controlling the image focusing locations comprises controlling a placement of the image focusing locations of the imaging optical systems to be before and after the focus location, respectively, such that the contrast evaluation values of the images of the subject corresponding to the image focusing locations are controlled to be equal to each other.

* * * * *